(12) United States Patent
Shao et al.

(10) Patent No.: US 11,776,378 B2
(45) Date of Patent: Oct. 3, 2023

(54) METHODS FOR PREDICTING GAS LEAKAGE BASED ON INDOOR SAFETY AND SMART GAS INTERNET OF THINGS SYSTEMS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Guanghua Huang, Chengdu (CN); Lei Zhang, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/051,526

(22) Filed: Nov. 1, 2022

(65) Prior Publication Data

US 2023/0071381 A1    Mar. 9, 2023

(30) Foreign Application Priority Data

Oct. 14, 2022   (CN) .......................... 202211256765.2

(51) Int. Cl.
*G08B 21/16* (2006.01)
*H04L 67/125* (2022.01)

(52) U.S. Cl.
CPC ............ *G08B 21/16* (2013.01); *H04L 67/125* (2013.01)

(58) Field of Classification Search
CPC ....... G08B 21/16; G08B 31/00; H04L 67/125; H04L 67/12; G06Q 10/103; G06Q 10/04;

(Continued)

(56) References Cited

U.S. PATENT DOCUMENTS

2008/0091456 A1    4/2008  Mayer
2018/0082565 A1*   3/2018  Braiman ................ G08B 25/14
(Continued)

FOREIGN PATENT DOCUMENTS

CN    107835222 A    3/2018
CN    109243148 A    1/2019
(Continued)

OTHER PUBLICATIONS

M. Rahmati, H. Yazdizadeh and A. Yazdizadeh, "Leakage detection in a gas pipeline using artificial neural networks based on wireless sensor network and Internet of Things," 2017 IEEE 15th International Conference on Industrial Informatics (INDIN), Emden, Germany, 2017, pp. 659-664 (Year: 2017).*

(Continued)

*Primary Examiner* — Quan Zhen Wang
*Assistant Examiner* — Rajsheed O Black-Childress
(74) *Attorney, Agent, or Firm* — METIS IP LLC

(57) ABSTRACT

The disclosure provides a method for predicting gas leakage based on indoor safety and a smart gas Internet of Things system. The method includes obtaining a gas data of a first area from at least one gas detection device; obtaining the gas data of the first area from a smart gas data center, predicting a gas concentration of a second area; judging whether the gas leakage occurs and determining a diffusion range of the gas leakage, and determining an emergency treatment plan; sending gas leakage information to the smart gas data center, and sending the gas leakage information to a smart gas user platform; and generating a remote control instruction based on the emergency treatment plan and sending the remote control instruction to the smart gas data center, and sending the remote control instruction to an indoor gas device object platform to execute control.

7 Claims, 5 Drawing Sheets

(58) Field of Classification Search
CPC .......... G06Q 50/06; G16Y 10/35; H04Q 9/00; H04Q 2209/84
See application file for complete search history.

(56) References Cited

U.S. PATENT DOCUMENTS

| | | |
|---|---|---|
| 2020/0309632 A1 | 10/2020 | Shao |
| 2021/0073291 A1 | 3/2021 | Hunter |

FOREIGN PATENT DOCUMENTS

| | | | |
|---|---|---|---|
| CN | 111832924 A | | 10/2020 |
| CN | 111911817 A | | 11/2020 |
| CN | 112070273 A | | 12/2020 |
| CN | 112561726 A | | 3/2021 |
| CN | 112986492 A | | 6/2021 |
| CN | 113259483 A | | 8/2021 |
| CN | 113657582 A | | 11/2021 |
| CN | 113944888 A | | 1/2022 |
| CN | 114139447 A | | 3/2022 |
| CN | 114352947 A | | 4/2022 |
| CN | 114390079 A | | 4/2022 |
| CN | 114398987 A | | 4/2022 |
| CN | 114777030 A | * | 7/2022 |
| CN | 114943482 A | | 8/2022 |
| CN | 114998074 A | | 9/2022 |

OTHER PUBLICATIONS

A. Varma, Prabhakar S and K. Jayavel, "Gas Leakage Detection and Smart Alerting and prediction using IoT," 2017 2nd International Conference on Computing and Communications Technologies (ICCCT), Chennai, India, 2017, pp. 327-333 (Year: 2017).*
First Office Action in Chinese Application No. 202211256765.2 dated Nov. 18, 2022, 23 pages.
Shao, Zehua, Exploration and Research on the Structure of Internet of Things, Internet of Things Technology, 2015, 10 pages.
Notification to Grant Patent Right for Invention in Chinese Application No. 202211256765.2 dated Dec. 6, 2022, 7 pages.

* cited by examiner

400

METHODS FOR PREDICTING GAS LEAKAGE BASED ON INDOOR SAFETY AND SMART GAS INTERNET OF THINGS SYSTEMS

CROSS-REFERENCE TO RELATED DISCLOSURES

This application claims priority to Chinese Patent Application No. 202211256765.2, filed on Oct. 14, 2022, the entire contents of which are hereby incorporated by reference.

TECHNICAL FIELD

This disclosure relates to the field of gas safety monitoring, in particular to methods for predicting gas leakage based on indoor safety and smart gas Internet of Things systems.

BACKGROUND

At present, the indoor gas safety monitoring mainly relies on the gas monitoring device installed on the site to provide sound and light alarms, and the alarm form is single. If the gas user is not at the leakage site, it is not conducive for the gas operator and the gas user to obtain the gas leakage information in time, which is prone to safety accidents.

Therefore, a method for predicting gas leakage based on indoor safety and a smart gas Internet of Things system are desirable to be provided, which may give early warning of gas leakage and determine the treatment plan in time to avoid the occurrence of gas safety accidents.

SUMMARY

One of the embodiments of this disclosure provides a method for predicting gas leakage based on indoor safety. The method is implemented by a smart city Internet of Things system. The smart gas Internet of Things system includes a smart gas user platform, a smart gas service platform, a smart gas management platform, an indoor gas device sensor network platform, and an indoor gas device object platform which interact in turn. The smart gas management platform includes a smart gas data center and an indoor gas safety management sub-platform. The method is executed by the smart gas management platform, including: the smart gas data center obtaining gas data of a first area from at least one gas detection device in the first area based on the indoor gas device sensor network platform, the first area being an area in the building where the gas detection device is installed, and the gas detection device being configured in the indoor gas device object platform. The indoor gas safety management sub-platform is configured to obtain the gas data of the first area from the smart gas data center, and predict the gas concentration of the second area based on the gas data of the first area, the second area being an area in the building where the gas detection device is not installed; judge whether the gas leakage occurs and determine a diffusion range of the gas leakage based on the gas data of the first area and the gas concentration of the second area, and determine an emergency treatment plan; send gas leakage information to the smart gas data center, and further send the gas leakage information to the smart gas user platform based on the smart gas service platform; and generate a remote control instruction based on the emergency treatment plan and send the remote control instruction to the smart gas data center, and send the remote control instruction to the indoor gas device object platform to execute control based on the indoor gas device sensor network platform.

One of the embodiments of this disclosure provides a smart gas Internet of Things system for predicting gas leakage based on indoor safety. The smart gas Internet of Things system includes the smart gas user platform, the smart gas service platform, the smart gas management platform, the indoor gas device sensor network platform, and the indoor gas device object platform which interact in turn. The smart gas management platform includes the smart gas data center and the indoor gas safety management sub-platform. The smart gas management platform is configured to obtain the gas data of the first area from at least one gas detection device in the first area through the smart gas data center based on the indoor gas device sensor network platform, the first area being the area in the building where the gas detection device is installed, and the gas detection device being configured in the indoor gas device object platform. The indoor gas device management sub-platform is configured to obtain the gas data of the first area from the smart gas data center, and predict the gas concentration of the second area based on the gas data of the first area, the second area being the area in the building where the gas detection device is not installed; judge whether the gas leakage occurs and determine the diffusion range of the gas leakage based on the gas data of the first area and the gas concentration of the second area, and determine the emergency treatment plan; send the gas leakage information to the smart gas data center, and further send the gas leakage information to the smart gas user platform based on the smart gas service platform; and generate the remote control instruction based on the emergency treatment plan and send the remote control instruction to the smart gas data center, and send the remote control instruction to the indoor gas device object platform to execute control based on the indoor gas device sensor network platform.

One of the embodiments of this disclosure provides a non-transitory computer readable storage medium, the storage medium stores computer instructions, and when the computer instructions are executed by at least one processor, the above-mentioned method for predicting the gas leakage based on indoor safety is implemented.

BRIEF DESCRIPTION OF THE DRAWINGS

This disclosure may be further described by way of exemplary embodiments, which may be described in detail with reference to the accompanying drawings. These embodiments are not limiting, and in these embodiments, the same numbers refer to the same structures, wherein.

DETAILED DESCRIPTION

Figure 1:
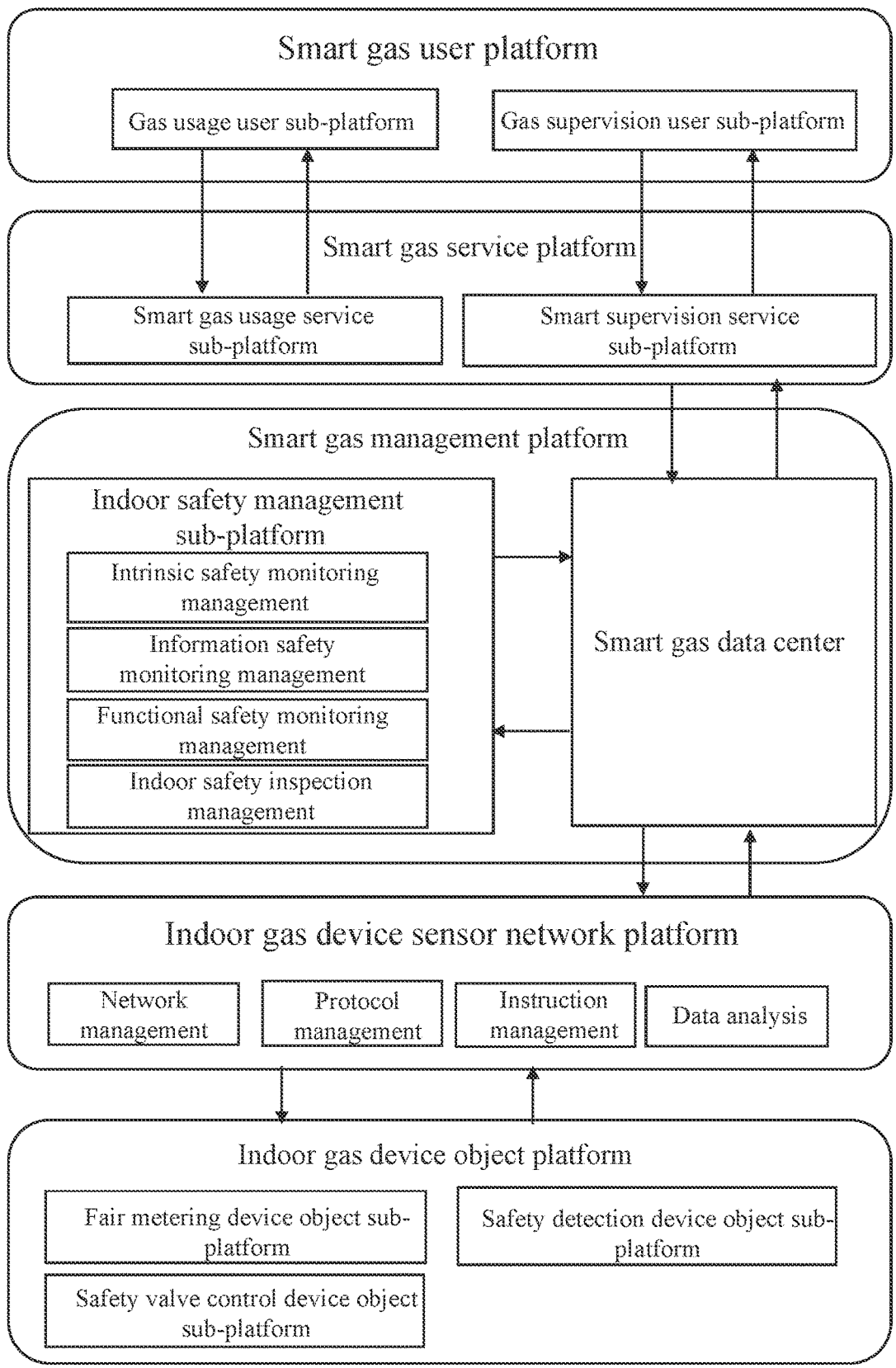
FIG. 1 is an exemplary schematic diagram of the smart gas Internet of Things system according to some embodiments of this disclosure.

In order to illustrate the technical schemes of the embodiments of the present disclosure more clearly, the following briefly introduces the accompanying drawings that are used in the description of the embodiments. Obviously, the accompanying drawings in the following description are only some examples or embodiments of the present disclosure. For ordinary technicians skilled in the art, the present disclosure may also be applied to other similar situations according to these accompanying drawings without any creative effort. Unless obviously obtained from the context or the context illustrates otherwise, the same numeral in the drawings refers to the same structure or operation.

It should be understood that "system", "device", "unit" and/or "module" as used herein is a method used to distinguish different components, elements, parts, sections, or assemblies at different levels. However, other words may be replaced by other expressions if the words serve the same purpose.

As shown in this disclosure and claims, unless the context clearly dictates otherwise, the words "a", "an", "a kind" and/or "the" are not intended to be specific in the singular and may include the plural. Generally speaking, the terms "comprising" and "including" only imply that the clearly identified steps and elements are included, and these steps and elements do not constitute an exclusive list, and the method or equipment may also include other steps or elements.

Flowcharts are used in this disclosure to illustrate operations performed by the system according to the embodiments of this disclosure. It should be understood that the preceding or following operations are not necessarily performed in the exact order. Instead, each step may be processed in reverse order or simultaneously. At the same time, other operations may be added to these processes, or a step or steps may be removed from these processes.

FIG. 1 is an exemplary schematic diagram of the smart gas Internet of Things system according to some embodiments of this disclosure.

As shown in FIG. 1, the smart gas Internet of Things system 100 includes a smart gas user platform, a smart gas service platform, a smart gas management platform, an indoor gas device sensor network platform, and an indoor gas device object platform.

In some embodiments, the processing of information in the Internet of Things may be divided into a processing process of perception information and a processing process of control information, and the control information may be information generated based on the perception information. The processing of the perception information is that the smart gas user platform obtains the perception information and transmits the perception information to the management platform. The control information is sent to the smart gas user platform by the smart gas management platform, so as to realize the corresponding control.

The smart gas user platform may be a platform for interaction with a user. In some embodiments, the smart gas user platform may be configured as terminal equipment, for example, the terminal equipment may include mobile equipment, a tablet computer, or the like, or any combination thereof. In some embodiments, the smart gas user platform may be configured to feed back the gas leakage information and an emergency treatment plan to the user. In some embodiments, the smart gas user platform is provided with a gas usage user sub-platform and a gas supervision user sub-platform. The gas usage user sub-platform is oriented to gas usage users, providing gas-related data and gas problem solutions for the gas usage users. For example, the gas usage user sub-platform may provide the gas usage users with personal gas use safety tips. The gas supervision user sub-platform is oriented to gas supervision users, providing the gas supervision users with gas leakage information within the jurisdiction, so that gas supervision users may supervise the safety of gas use within the jurisdiction. The gas supervision users may include gas company managers, or the like. In some embodiments, the smart gas user platform may interact downward with the smart gas service platform, and receive the gas leakage information and the emergency treatment plan uploaded by the smart gas service platform.

The smart gas service platform may be a platform for receiving and transmitting data and/or information. For example, the smart gas service platform may send the gas leakage information to the smart gas user platform. In some embodiments, the smart gas service platform is provided with a smart gas usage service sub-platform and a smart supervision service sub-platform. The smart gas usage service sub-platform corresponds to the gas usage user sub-platform, providing safe gas usage services for the gas usage users. The smart supervision service sub-platform corresponds to the gas supervision user sub-platform, providing safety supervision services for the gas supervision users. In some embodiments, the smart gas service platform may interact downward with the smart gas management platform, and receive the gas leakage information and the emergency treatment plan uploaded by the smart gas management platform.

The smart gas management platform may refer to a platform that coordinates the connection and collaboration between various functional platforms, gathers all the information of the Internet of Things, and provides perception management and control management functions for the Internet of Things operation system. For example, the smart gas management platform may obtain the gas data of the first area (e.g., the gas consumption, the gas concentration sequence, etc.).

In some embodiments, the smart gas management platform is provided with a smart gas data center and a plurality of indoor gas safety management sub-platforms. The indoor gas safety management sub-platforms bidirectionally interact with the smart gas data center. A plurality of indoor gas safety management sub-platforms store, process and/or transmit the corresponding data according to different data sources. Each indoor gas safety management sub-platform may further aggregate the processed data to the smart gas data center. The indoor gas safety management sub-platform may realize intrinsic safety monitoring management, information safety monitoring management, functional safety monitoring management, and indoor safety inspection management. The smart gas data center analyzes, processes, and stores the aggregated data, and then uploads the data to the upper smart gas service platform and sends the data to the lower indoor gas device sensor network platform.

The indoor gas device sensor network platform may be a functional platform for managing sensor communication. The indoor gas device sensor network platform may be configured as a communication network and a gateway to realize functions such as network management, protocol management, instruction management, and data analysis. In some embodiments, the indoor gas device sensor network platform may be connected to the smart gas management platform and the indoor gas device object platform to realize the functions of perception information sensor communication and control information sensor communication. For example, the indoor gas device sensor network platform may receive a remote control instruction sent by the smart gas data center, and send the remote control instruction to the indoor gas device object platform.

The indoor gas device object platform may be a functional platform for perception information generation. The indoor gas device object platform may further be provided with a fair metering device object sub-platform, a smart gas safety detection device object sub-platform, and a safety valve control device object sub-platform. The fair metering device object sub-platform includes a gas flow metering device for recording gas consumption. The smart gas safety detection device object sub-platform includes at least one gas detection device, and the gas detection device is installed in the first area and used to obtain gas-related information in the first area. The safety valve control device object sub-platform may control the opening and closing of a corresponding gas valve according to the corresponding emergency treatment plan in response to the remote control instruction.

It should be noted that the smart gas user platform in this embodiment may be a desktop computer, a tablet computer, a notebook computer, a mobile phone, or other electronic devices capable of realizing data processing and data communication, which is not limited here. It should be understood that the data processing process mentioned in this embodiment may be processed by the processor of the server, and the data stored in the server may be stored in a storage device of the server, such as a hard disk or other memory. In specific applications, the indoor gas device sensor network platform may use a plurality of groups of gateway servers or a plurality of groups of intelligent routers, which are not limited here. It should be understood that the data processing process mentioned in this embodiment of the present disclosure may be processed by the processor of the gateway server, and the data stored in the gateway server may be stored in the storage device of the gateway server, such as hard disk and storage such as SSD.

In some embodiments, the gas detection device is various monitoring devices relied on in indoor gas concentration monitoring. Taking a mechanical product as an example, the gas concentration monitoring device may include a gas monitoring alarm, a combustible gas detector, or the like.

In some embodiments of this disclosure, through the above query methods, the gas leakage related data is used to determine the gas leakage situation in each area, and the emergency treatment plan for the gas leakage is formulated, so that users may quickly give feedback on the gas leakage situation.

It should be noted that the above description of the system and the components thereof is only for the convenience of description, and does not limit the disclosure to the scope of the illustrated embodiments. It may be understood that for the technical personnel skilled in the art, after understanding the principle of the system, it is possible to arbitrarily combine the various components, or form a subsystem to connect with other components without departing from the principle. For example, the smart gas management platform and the smart gas service platform may be integrated into one component. As another example, each component may share one storage device, and each component may also have its own storage device. Such variations are within the protection range of this disclosure.

Figure 2:
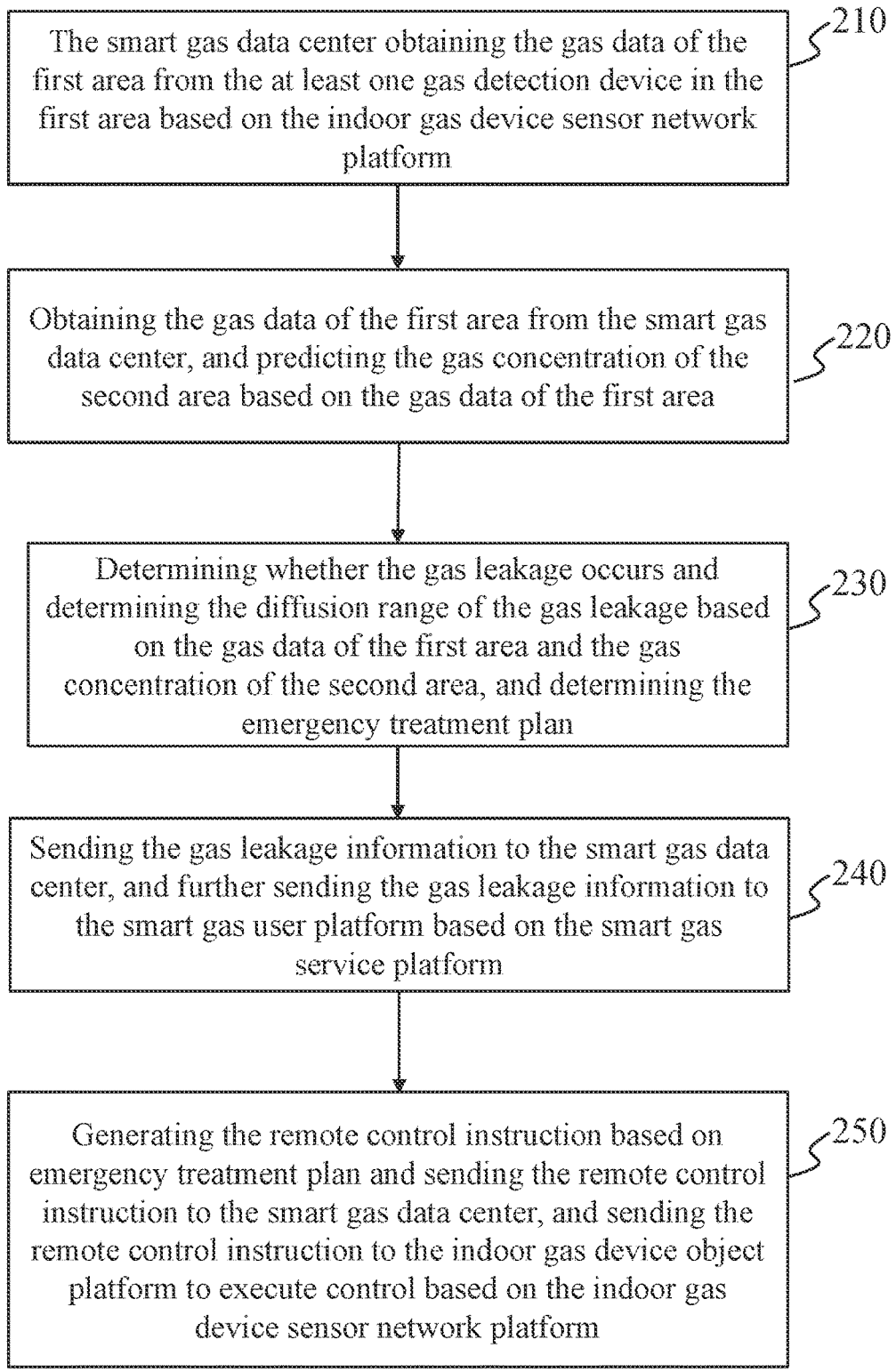
FIG. 2 is an exemplary flowchart of the method for predicting the gas leakage according to some embodiments of this disclosure.

FIG. 2 is an exemplary flowchart of the method for predicting the gas leakage according to some embodiments of this disclosure. In some embodiments, process 200 may be executed by the smart gas management platform.

Step 210, the smart gas data center obtaining the gas data of the first area from the at least one gas detection device in the first area based on the indoor gas device sensor network platform. In some embodiments, step 210 may be executed by the smart gas data center.

The first area is an area in the building where the gas concentration monitoring device is installed. The building may include a commercial facility, a residential building, or other buildings. For example, the commercial facility A includes a shop A, a shop B, and a shop C. The shop A and the shop B are provided with the gas detection device, and the shop A and the shop B are the first area.

The gas detection device is a device capable of obtaining the gas data. For example, the gas detection device may be used to obtain the gas concentration. The gas detection device may include a gas concentration sensor, a gas alarm device, a gas meter, etc. The gas detection device may be installed at a plurality of areas in the building. For example, the gas detection device may be installed at a passage (e.g., the entrance of a safety passage, the entrance of an elevator, etc.), or the gas detection device may be installed near a gas pipeline and a gas meter. In some embodiments, the gas detection device is configured in the indoor gas device object platform.

In some embodiments, the gas data may include: the gas consumption within a preset time period and the gas concentration sequence within the preset time period. The preset time period may be manually set.

In some embodiments, the smart gas data center may obtain the gas consumption within the preset time period through the gas meter.

The gas concentration sequence may refer to sequence data composed of a plurality of gas concentration. In some embodiments, the gas concentration sequence within the preset time period may refer to the sequence data obtained by collecting a plurality of gas concentration according to a certain collection interval. The collection interval may refer to an interval between time points of a plurality of collections The gas concentration sequence may be represented by a vector. For example, the gas concentration collected at 6:10, 6:30, and 6:50 are 5 ppm, 7 ppm, and 10 ppm, respectively, and the corresponding gas concentration sequence may be ((6:10, 5), (6:30, 7), (6:50, 10)). In some embodiments, the indoor gas safety management sub-platforms may communicate with a gas concentration sensor in the first area to obtain the gas concentration at a plurality of time points within the preset time period to determine the gas concentration sequence.

In some embodiments, the gas concentration sequence within the preset time period may also refer to the sequence data obtained by collecting the gas concentration at plurality of points at the same time point.

In some embodiments, the collection interval of the gas concentration sequence is related to the relevant statistics of the gas concentration sequence. The relevant statistics may refer to a statistical result of the gas concentration within the preset time period, which may be used to characterize the variation law and discreteness of the gas concentration. The relevant statistics may include a variance, a standard deviation, etc. of the gas concentration sequence, and the relevant statistics of the gas concentration sequence may be determined through the calculation formula of the variance and the standard deviation. The greater variance and/or standard deviation is, the greater dispersion of the corresponding gas concentration is, that is, it is difficult to determine the variation law of the gas concentration with time (e.g., the gas concentration increases or decreases with time), and the collection interval may be reduced accordingly to obtain the gas concentration at more time points.

In some embodiments, the collection interval may be uniform or non-uniform. For example, the collection interval in the time period corresponding to the high gas concentration in the gas concentration sequence may be set to be small, so as to obtain the gas concentration at more time points, and to better grasp the change of the gas concentration when the gas concentration is too high.

In some embodiments of this disclosure, the collection interval of the gas concentration is determined according to the relevant statistics, which makes the collection method of the gas concentration more flexible, so as to accurately obtain the change law of the concentration, which is helpful for decision makers to make further judgments.

Step 220, obtaining the gas data of the first area from the smart gas data center, and predicting the gas concentration of the second area based on the gas data of the first area. In some embodiments, step 220 may be executed by the indoor gas safety management sub-platforms.

The second area may refer to an area in the building where the gas detection device is not installed.

In some embodiments, the indoor gas safety management sub-platform may predict the gas concentration of the second area through a concentration prediction model based on the gas data of the first area. In some embodiments, the concentration prediction model may be a deep neural network model, or the like.

In some embodiments, the concentration prediction model may be obtained through training. For example, a training sample is inputted to an initial concentration prediction model, and a loss function is established based on a label and an output result of the initial concentration prediction model, and parameters of the initial concentration prediction model are updated. When the loss function of the initial concentration prediction model satisfies the preset conditions, the model training is completed, and the preset conditions may be that the loss function converges, the number of iterations reaches a threshold, or the like.

In some embodiments, the training sample may be historical gas data corresponding to the first area of a building in a plurality of historical leakage events, and the training sample may be obtained based on the historical data. The label of the training sample may be the historical gas concentration for the second area of the building at the same leakage time. The label may be obtained based on historical detection data, and the historical detection data includes the actual detected historical gas concentration of the second area.

In some embodiments, the indoor gas safety management sub-platforms may predict the gas concentration of the second area based on a building graph. The building graph may be constructed based on nodes and edges, the nodes of the building graph correspond to the first sub-areas in the building, and the edges of the building graph correspond to the passages between the first sub-areas. For more contents about predicting the gas concentration of the second area based on building graph, please refer to FIG. 3 and related descriptions thereof.

Step 230, determining whether the gas leakage occurs and determining the diffusion range of the gas leakage based on the gas data of the first area and the gas concentration of the second area, and determining the emergency treatment plan. In some embodiments, step 230 may be executed by the indoor gas safety management sub-platforms.

In some embodiments, the indoor gas safety management sub-platform may determine an area where the gas concentration exceeds a concentration threshold as the diffusion range of the gas leakage. The concentration threshold may be manually set. The threshold may be different for different areas.

The emergency treatment plan may include closing a gas valve at a gas leakage point, closing a main gas valve of the building, evacuating the crowd in the building, dealing with the gas within the diffusion range, and reporting to the relevant departments. The gas leakage point may be the source of the gas leakage. For more contents about the gas leakage point, please refer to FIG. 5 and related descriptions thereof.

In some embodiments, the indoor gas safety management sub-platforms may preset the corresponding relationship between the accident level of gas leakage and the emergency treatment plan based on relevant data, and determine the corresponding emergency treatment plan according to the accident level of gas leakage. In some embodiments, the accident level of gas leakage may be determined according to the diffusion range and the gas concentration. For example, a threshold A, a threshold B, etc. may be set for the diffusion range in an ascending manner, and a threshold M, a threshold N, etc. may be set for the highest gas concentration in an ascending manner. When the diffusion range is smaller than the threshold A or the highest gas concentration is smaller than the threshold M, the corresponding level is a first-level leakage accident. When the diffusion range is between the threshold A and the threshold B or the highest gas concentration is between the threshold M and the threshold N, the corresponding level is a second-level leakage accident. When the diffusion range is greater than the threshold A or the highest gas concentration is greater than the threshold M, the corresponding level is a third-level leakage accident. When the level of the gas leakage accident determined according to the diffusion range and the gas concentration is inconsistent, the highest level of the correspondingly determined gas leakage accident may be used as the current level of the gas leakage accident. The level of gas leakage accident corresponds to the emergency treatment plan one by one. For example, the emergency treatment plan corresponding to the first-level leakage accident may be closing the gas valve at the gas leakage point, strengthening ventilation, etc. The emergency treatment plan corresponding to the second-level leakage accident may be closing the gas valve at the gas leakage point and the main gas valve of the building, strengthening ventilation, evacuating the crowd in the area, etc. The emergency treatment plan corresponding to the third-level leakage accident may be closing the gas valve at the gas leakage point, closing the main gas valve of the building, evacuating the crowd in the building, dealing with the gas within the diffusion range, reporting to the relevant departments, etc.

Step 240, sending the gas leakage information to the smart gas data center, and further sending the gas leakage information to the smart gas user platform based on the smart gas service platform. In some embodiments, step 240 may be executed by the indoor gas safety management sub-platforms.

The gas leakage information may include the gas data of the first area, the gas concentration of the second region, whether the gas leakage occurs, and the diffusion range of the gas leakage.

In some embodiments, the indoor gas safety management sub-platforms may also send the gas leakage information to the smart gas data center, and further send the gas leakage information to the smart gas user platform through the smart gas service platform.

Step 250, generating the remote control instruction based on the emergency treatment plan and sending the remote control instruction to the smart gas data center, and sending the remote control instruction to the indoor gas device object platform to execute control based on the indoor gas device sensor network platform. In some embodiments, step 250 may be executed by the indoor gas safety management sub-platforms.

In some embodiments, the indoor gas device object platform may perform the corresponding emergency treatment plan based on the received remote control instruction.

In some embodiments of this disclosure, different emergency treatment plans are selected according to the predicted diffusion range of gas leakage, etc., which may improve resource utilization efficiency, effectively reduce the possibility of potential danger, and achieve optimal treatment efficiency.

Figure 3:
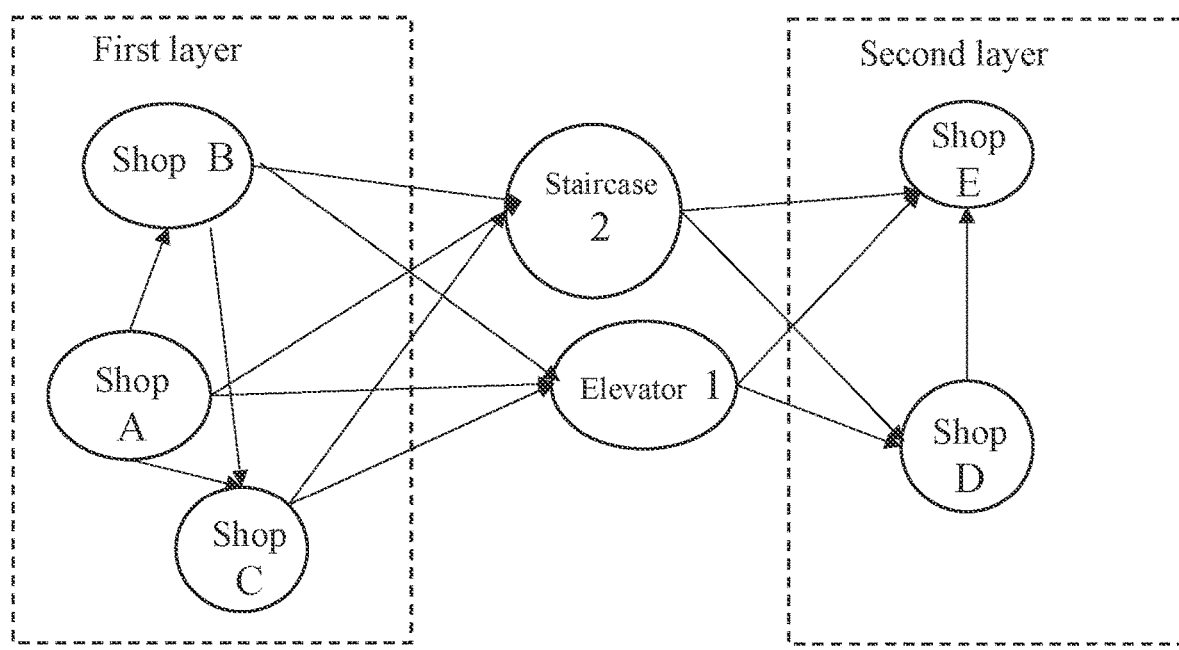
FIG. 3 is an exemplary schematic diagram of the building graph according to some embodiments of this disclosure.

FIG. 3 is an exemplary schematic diagram of the building graph according to some embodiments of this disclosure.

In some embodiments, the indoor gas safety management sub-platforms may construct the building graph based on the nodes and the edges.

The nodes of the building graph correspond to the first sub-areas in the building, and the node features may include space volume and the gas data. The space volume is a space volume of the nodes corresponding to the first sub-areas. In some embodiments, the node features may also include a temperature of the first sub-areas. The temperature of the first sub-areas may be obtained by a temperature sensor installed in the first sub-areas.

The first sub-areas may refer to a plurality of areas divided inside the building. For example, the first sub-areas may refer to areas such as shops, elevators, and toilets in a commercial building. As another example, the first sub-areas may refer to the residential rooms, elevators, or other areas in the residential building.

As shown in FIG. 3, taking the building graph corresponding to a commercial facility as an example, the nodes of the building 300 may include a shop A, a shop B, a shop C, a shop D, a shop E, an elevator 1 and a staircase 2. The shop A, the shop B. and the shop C are set on the first floor of the building, while the shop D and the shop E are set on the second floor of the building.

The edges of the building graph correspond to the passages between the first sub-areas. The passages may refer to channels connecting the first sub-areas, for example, as shown in FIG. 3, the passages connecting the shop A and the shop B, and the passages connecting the elevator C and the shop A. The edges of the building graph may be determined according to the drawings related to the building structure. The edge features of the building graph may include diffusivity and dissipation.

The diffusivity may refer to the ability of the gas to diffuse into other areas or passages in the building. Exemplarily, the diffusivity may be determined according to the formula (1).

$$\alpha = \gamma \frac{V}{S} \quad (1)$$

where α represents the diffusivity of the gas, V represents the space volume of the first sub-areas, S represents the area of the doors and/or windows where the first sub-areas communicate with the passages in the building, and γ is a constant representing the diffusion coefficient.

In some embodiments, the higher the diffusivity is, the greater the ability of the gas to diffuse to the passages and/or other first sub-areas in the building is.

Dissipation may refer to the ability of gas to diffuse out of the building. Exemplarily, the dissipation may be determined according to the formula (2).

$$\delta = \beta \frac{V}{m} \quad (2)$$

where δ represents the dissipation of gas, V represents the space volume of the first sub-areas, and m represents the area of the doors and/or window where the first-sub-areas communicate with the outside space of the building, and β is a constant representing the dissipation coefficient.

In some embodiments, the gas may diffuse to the outside of the building through the doors and/or windows which communicate with the outside space of the building. Since the outside space is large, the gas diffuses to the outside space of the building, which may relatively reduce the diffusion of gas to other areas in the building. The higher the dissipation is, the more the gas dissipated to the outside air is, and the less the gas diffused to the passages and/or other first sub-areas in the building is.

In some embodiments, the edges of the building graph may be directed edges, which point from the nodes with a high temperature to the nodes with a low temperature. The direction of the directed edges may represent the diffusion direction of the gas.

As shown in FIG. 3, the diffusion direction of gas is indicated by the directed solid edges between the shop A, the shop B, the shop C, the shop D, the shop E, the elevator 1 and the staircase 2. Since the temperature of the second floor is lower than that of the first floor, the diffusion direction of gas may be diffused from the first floor where the shop A is located to the second floor where the shop D and the shop E are located through the elevator 1 and/or staircase 2, and since the temperature of the shop E on the second floor is the lowest, the gas from the elevator 1, the staircase 2, and the shop D diffuses toward the shop E.

In some embodiments of this disclosure, by considering the effect of the temperature on gas diffusion, the diffusion range of gas and the gas concentration of the second area may be more accurately predicted.

In some embodiments, the indoor gas safety management sub-platforms may predict the gas concentration of the second area based on the building graph.

In some embodiments, the indoor gas safety management sub-platforms may process the building graph through a graph neural network model to determine the gas concentration of each node in the second area. For more contents about the gas concentration of the second area, please refer to FIG. 5 and related descriptions thereof.

In some embodiments of this disclosure, by constructing the building graph to determine the gas concentration of the area where the gas concentration monitoring device is not installed, an efficient and accurate estimation method may be implemented, so as to more accurately determine the gas concentration and the change thereof in the area corresponding to each node, and further determine the diffusion range.

In some embodiments, the indoor gas safety management sub-platform may further construct node sub-graphs based on the internal structure of the first sub-areas.

In some embodiments, the nodes of the node sub-graphs correspond to the second sub-areas in the first sub-areas.

Figure 4:
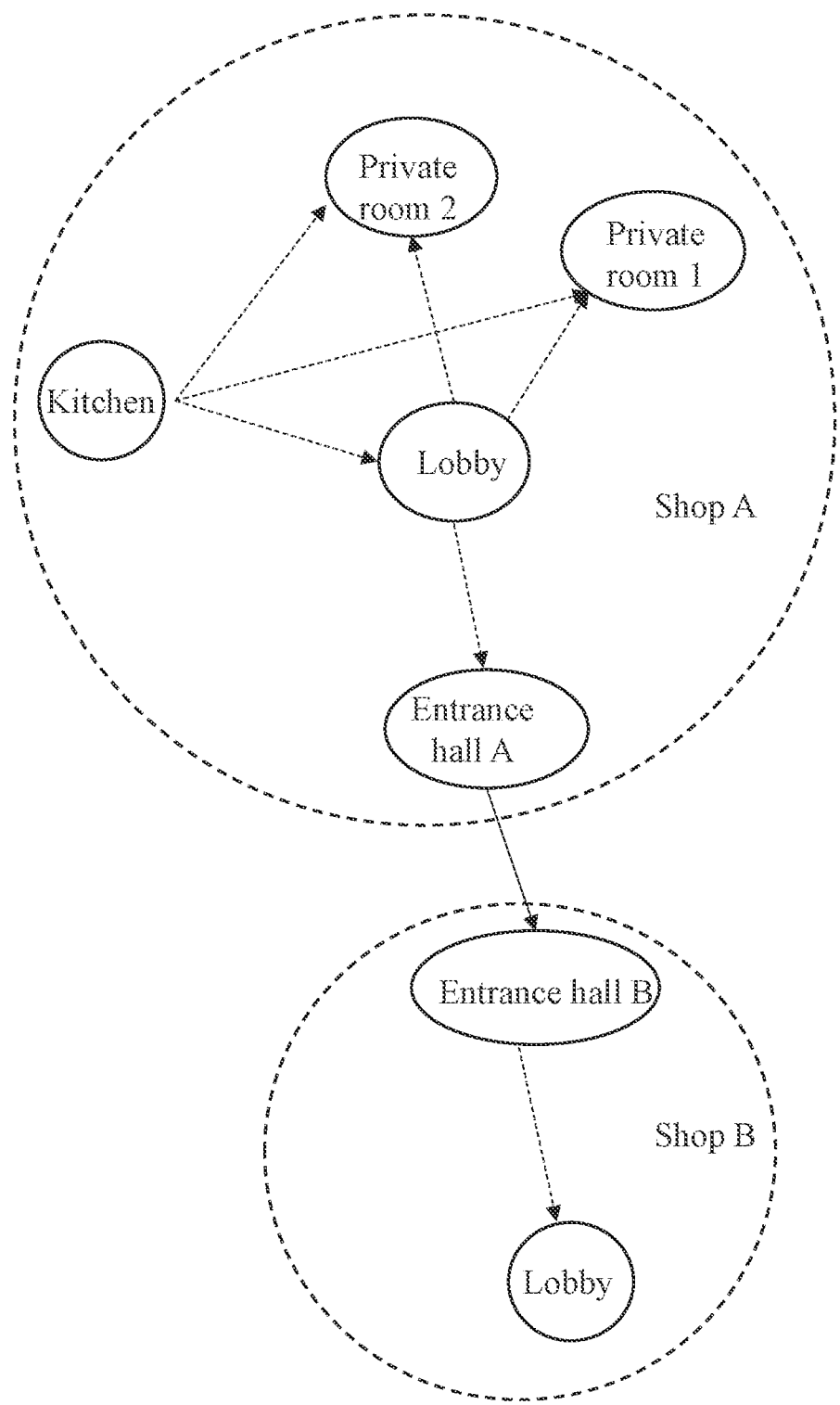
FIG. 4 is an exemplary schematic diagram of the node sub-graphs according to some embodiments of this disclosure.

The second sub-areas may refer to a plurality of areas divided inside the first sub-areas. As shown in FIG. 4, the first sub-areas are the shop A, and the second sub-areas may include a kitchen, a private room 1, a private room 2, a lobby, an entrance hall A, etc. of the shop A.

The node features of the node sub-graphs include a temperature of each second sub-area. The temperature of each second sub-area may be obtained by the temperature sensor in each second sub-area.

The edges of the node sub-graphs correspond to the passages between the second sub-areas. For example, the passages between the second sub-areas may be the doors and aisles between any two second sub-areas. The passages between the second sub-areas may be obtained according to the drawings related to the building structure design.

In some embodiments, the edges of the node sub-graphs may be directed edges, which are similar to the edges of the building graph. As shown in FIG. 4, the first sub-areas in the node sub-graph 400 include the shop A and the shop B, and the edges between the kitchen, the private room 1, the private room 2, the lobby, and the entrance hall A in the shop A are represented by directed dotted edges, representing the direction of gas diffusion in the shop A. The edges between the lobby and the entrance hall B in the shop B are also represented through the directed dotted edges, representing the direction of gas diffusion in the shop B. The directed solid edges are represented between the shop A and the hop B, representing the direction of gas diffusion between the first sub-areas.

In some embodiments, the gas concentration of the nodes in the building graph corresponds to the gas concentration of the second sub-areas in the node sub-graphs of the nodes connected to the external passages of the nodes. As described in FIG. 4, the gas concentration of the shop B corresponds to the gas concentration of the entrance hall in the shop B connected to the external passages.

In some embodiments of this disclosure, by further refining the internal structure of the nodes in the building graph and determining the diffusion path and direction of the gas between the second sub-areas, the details of the building graph may be enriched and the gas concentration and the change thereof in the area corresponding to each node may be more accurately determined.

Figure 5:
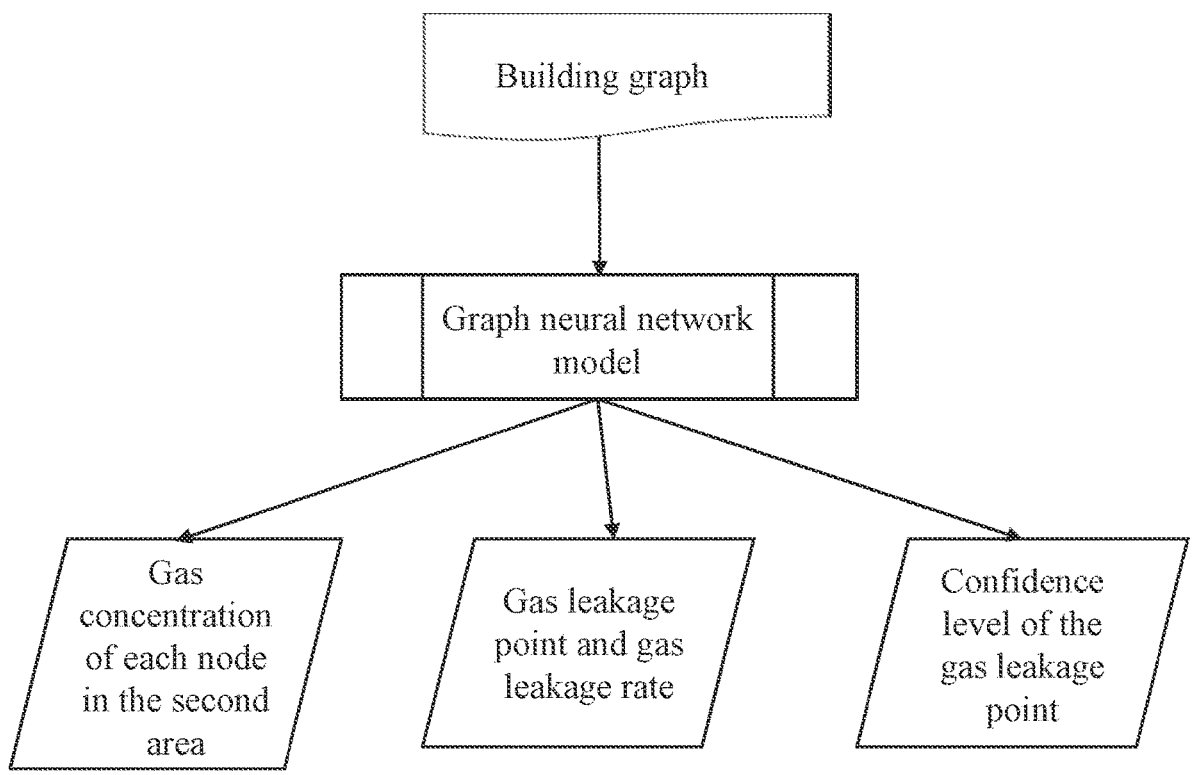
FIG. 5 is an exemplary schematic diagram of determining the gas concentration of the second area according to some embodiments of this disclosure.

FIG. 5 is an exemplary schematic diagram of determining the gas concentration of the second area according to some embodiments of this disclosure.

In some embodiments, the indoor gas safety management sub-platform may process the building graph through the graph neural network model to determine the gas concentration of each node in the second area.

In some embodiments, the graph neural network model may use each node in the building graph as an output node, which outputs the gas concentration of each node in the second area.

In some embodiments, the graph neural network model may determine the gas concentration of the second area at the current time point, and may also determine the gas concentration of the second region at a future time point. When the node features and the edge features in the training sample are related to the gas condition at the current time point, the trained graph neural network model may be used to determine the gas concentration of the second area at the current time point. When the node features and the edge features in the training sample are related to the gas condition at a plurality of historical time points, the trained graph neural network model may be used to determine the gas concentration of the second area at the future time point.

In some embodiments, the output of the graph neural network model also includes the gas leakage point and gas leakage rate thereof. Correspondingly, the graph neural network model may use the node corresponding to the gas leakage point as an output node, which outputs the gas leakage point and gas leakage rate.

The gas leakage point may be the source of gas leakage. For example, the gas leakage point may be a node corresponding to the area where the source of gas leakage occurs. The gas concentration of the gas leakage point is higher than a normal range, and the gas leakage rate at the gas leakage point is high. The gas leakage rate may refer to the rate at which the gas concentration increases.

In some embodiments, when the graph neural network model analyzes the building graph, the node corresponding to the gas leakage point may be used as the output node, the node is determined as the gas leakage point, and the gas leakage rate of the gas leakage point is outputted.

In some embodiments, the output of the graph neural network model also includes a confidence level of the gas leakage point.

The confidence level may represent the possibility that the node is the gas leakage point. For example, if the confidence level of a node A is 0.1, it is less possibilty that the node A is the gas leakage point.

In some embodiments, the confidence level is related to the collection interval of the gas concentration sequence. The larger the collection interval is, the lower the confidence level is. For example, the confidence level may be obtained by calculating "1/collection interval (unit: s)", for example, when the collection interval is 2 s, the confidence level may be 0.5.

In some embodiments, the neural network model may be obtained through training. For example, a plurality of training samples with labels are inputted to an initial graph neural network model, a loss function is constructed based on the labels and the corresponding output of the initial graph neural network model respectively, and the parameters of the initial graph neural network model are iteratively updated based on the loss function until the preset parameters are met, and then the model training is completed. The preset conditions may be that the loss function converges, the number of iterations reaches a threshold, or the like.

In some embodiments, the training sample may include building graphs corresponding to a plurality of areas, and the labels may be the gas concentration of each node in the building graph. In some embodiments, the labels may also include the gas leakage point and its gas leakage rate marked in advance. In some embodiments, the labels may be obtained through manual annotation, or determined based on data obtained by simulation software simulation.

In some embodiments of this disclosure, the graph neural network model is used to process the building graph, and the connection between the nodes and the edges may be considered, and changes in the node features may be accurately analyzed, so that the prediction result is more accurate. At the same time, the gas leakage point and its gas leakage rate are determined by the graph neural network model, which may increase the generality of the model and make the model suitable for scenarios where the gas leakage point is unknown. Furthermore, the model synchronously outputs the confidence level of the gas leakage point, which may reflect the estimation of the accuracy of the model prediction, which is helpful for decision makers to make further judgments.

It should be noted that different embodiments may have different beneficial effects, and in different embodiments, the possible beneficial effects may be any one or a combination of the above, or any other possible beneficial effects.

The basic concepts have been described above. Obviously, for technical personnel skilled in the art, the above detailed disclosure is merely an example, and does not constitute a limitation of the present disclosure. Although not explicitly described herein, various modifications, improvements, and corrections to this disclosure may occur to technical personnel skilled in the art. Such modifications, improvements, and corrections are suggested in this disclosure, so such modifications, improvements, and corrections still belong to the spirit and scope of the exemplary embodiments of this disclosure.

At the same time, the present disclosure uses specific words to describe the embodiments of the present disclosure. For example, "one embodiment," "an embodiment," and/or "some embodiments" means a certain feature, structure, or characteristic associated with at least one embodiment of this disclosure. Therefore, it should be emphasized and noted that two or more references to "an embodiment" or "one embodiment" or "an alternative embodiment" in various places in this disclosure are not necessarily referring to the same embodiment. In addition, certain features, structures, or characteristics of the one or more embodiments of this disclosure may be combined as appropriate.

In addition, unless explicitly stated in the claims, the order of processing elements and sequences described in this disclosure, the use of alphanumerics, or the use of other names is not intended to limit the order of the processes and methods of this disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be noted that, in order to simplify the expressions disclosed in this disclosure and thus help the understanding of one or more embodiments, in the foregoing description of the embodiments of this disclosure, various features may sometimes be combined into one embodiment, accompanying drawing or description. However, this method of disclosure does not imply that the subject matter of the disclosure requires more features than are recited in the claims. Rather, claimed subject matter may lie in less than all features of a single foregoing disclosed embodiment.

Some embodiments use numbers to describe quantities of ingredients and attributes, it should be understood that such numbers used to describe the embodiments, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters used in the specification and claims are approximate values, and the approximate values may be changed according to characteristics required by individual embodiments. In some embodiments, the numerical parameters should take into account the specified significant digits and use a general digit reservation method. Notwithstanding that the numerical fields and parameters used in some embodiments of this disclosure to confirm the breadth of their ranges are approximations, in specific embodiments such numerical values are set as precisely as practicable.

For each patent, patent application, patent application publication, and other material, such as an article, a book, a specification, a publication, a document, etc., cited in this disclosure, the entire contents of which are hereby incorporated into this disclosure by reference. Application history documents that are inconsistent with or conflict with the contents of this disclosure are excluded, as are documents (currently or hereafter appended to this disclosure) limiting the broadest scope of the claims of this disclosure. It should be noted that, if there is any inconsistency or conflict between the descriptions, definitions and/or use of terms in the accompanying materials of this disclosure and the contents of this disclosure, the descriptions, definitions and/or use of terms in this disclosure shall prevail.

Finally, it should be understood that the embodiments described in this disclosure are only used to illustrate the principles of the embodiments of this disclosure. Other variations may also belong to the scope of this disclosure. Accordingly, by way of examples and not limitations, alternative configurations of the embodiments of this disclosure may be considered consistent with the instruction of this disclosure. Correspondingly, the embodiments of this disclosure are not limited to the embodiments expressly introduced and described in this disclosure.

What is claimed is:

1. A method for predicting gas leakage based on indoor safety, wherein the method is implemented by a smart gas Internet of Things system, and the smart gas Internet of Things system includes a smart gas user platform, a smart gas service platform, a smart gas management platform, an indoor gas device sensor network platform and an indoor gas device object platform which interact in turn, the smart gas management platform includes a smart gas data center and an indoor gas safety management sub-platform, and the method is executed by the smart gas management platform, including:

the smart gas data center obtaining gas data of a first area from at least one gas detection device in the first area based on the indoor gas device sensor network platform, the first area being an area in a building where the at least one gas detection device is installed, and the at least one gas detection device being configured in the indoor gas device object platform;

the indoor gas safety management sub-platform configured to:

obtain the gas data of the first area from the smart gas data center, and predict a gas concentration of a second area based on the gas data of the first area, the second area being an area in the building where the at least one gas detection device is not installed;

judge whether the gas leakage occurs and determine a diffusion range of the gas leakage based on the gas data of the first area and the gas concentration of the second area, and determine an emergency treatment plan;

send gas leakage information to the smart gas data center, and further send the gas leakage information to the smart gas user platform based on the smart gas service platform; and generate a remote control instruction based on the emergency treatment plan and send the remote control instruction to the smart gas data center, and send the remote control instruction to the indoor gas device object platform to execute control based on the indoor gas device sensor network platform; wherein the predicting a gas concentration of a second area based on the gas data of the first area includes:

constructing a building graph based on nodes and edges, wherein the nodes of the building graph correspond to first sub-areas in the building, the edges of the building graph correspond to passages between the first sub-areas, the first sub-areas include a plurality of areas divided inside the building, node features of the nodes of the building graph include space volume, gas concentration and temperature, the edges of the building graph are directed edges, a direction of the directed edges represents a diffusion direction of gas, edge features of the edges of the building graph include diffusivity and dissipation, the diffusivity refers to an ability of the gas to diffuse into other areas or passages in the building, and the dissipation refers to an ability of the gas to diffuse out of the building; wherein the gas concentration of the nodes in the building graph corresponds to the gas concentration of second sub-areas in node sub-graphs of the nodes connected to external passages of the nodes, the node sub-graphs are contracted based on an internal structure of the first sub-areas, the node sub-graphs include a plurality of nodes, the nodes of the node sub-graphs correspond to the second sub-areas in the first sub-areas, and the second sub-areas include the plurality of areas divided inside the first sub-areas; and predicting the gas concentration of each node in the second area through processing the building graph by a graph neural network model based on the building graph, wherein an output of the graph neural network model includes the gas concentration of each node in the building graph, a gas leakage point and a gas leakage rate of the gas leakage point.

2. The method for predicting the gas leakage based on indoor safety of claim 1, wherein the gas data includes: gas consumption within a preset time period and gas concentration sequence within the preset time period.

3. The method for predicting the gas leakage based on indoor safety of claim 1, wherein node features of the node sub-graphs include a temperature of each second sub-area, and the edges of the node sub-graphs correspond to the passages between the second sub-areas.

4. A non-transitory computer readable storage medium, wherein the storage medium stores computer instructions, and when the computer instructions are executed by at least one processor, the method for predicting the gas leakage based on the indoor safety of claim 1 is implemented.

5. A smart gas Internet of Things system for predicting gas leakage based on indoor safety, wherein the smart gas Internet of Things system includes a smart gas user platform, a smart gas service platform, a smart gas management platform, an indoor gas device sensor network platform, and an indoor gas device object platform which interact in turn, the smart gas management platform includes a smart gas data center and an indoor gas safety management sub-platform, and the smart gas management platform is configured to:

obtain gas data of a first area from at least one gas detection device in the first area through the smart gas data center based on the indoor gas device sensor network platform, the first area being an area in a building where the at least one gas detection device is installed, and the at least one gas detection device being configured in the indoor gas device object platform;

the indoor gas device management sub-platform is configured to:

obtain the gas data of the first area from the smart gas data center, and predict a gas concentration of a second area based on the gas data of the first area, wherein the second area is an area in the building where the at least one gas detection device is not installed;

judge whether the gas leakage occurs and determine a diffusion range of the gas leakage based on the gas data of the first area and the gas concentration of the second area, and determine an emergency treatment plan;

send gas leakage information to the smart gas data center, and further send the gas leakage information to the smart gas user platform based on the smart gas service platform; and generate a remote control instruction based on the emergency treatment plan and send the remote control instruction to the smart gas data center, and send the remote control instruction to the indoor gas device object platform to execute control based on the indoor gas device sensor network platform; wherein the predicting a gas concentration of a second area based on the gas data of the first area includes:

constructing a building graph based on nodes and edges, wherein the nodes of the building graph correspond to first sub-areas in the building, the edges of the building graph correspond to passages between the first sub-areas, the first sub-areas include a plurality of areas divided inside the building, node features of the nodes of the building graph include space volume, gas concentration and temperature, the edges of the building graph are directed edges, a direction of the directed edges represents a diffusion direction of gas, edge features of the edges of the building graph include diffusivity and dissipation, the diffusivity refers to an ability of the gas to diffuse into other areas or passages in the building, and the dissipation refers to an ability of the gas to diffuse out of the building; wherein the gas concentration of the nodes in the building graph corresponds to the gas concentration of second sub-areas in node sub-graphs of the nodes connected to external passages of the nodes, the node sub-graphs are contracted based on an internal structure of the first sub-areas, the node sub-graphs include a plurality of nodes, the nodes of the node sub-graphs correspond to the second sub-areas in the first sub-areas, and the second sub-areas include the plurality of areas divided inside the first sub-areas; and predicting the gas concentration of each node in the second area through processing the building graph by a graph neural network model based on the building graph, wherein an output of the graph neural network model includes the gas concentration of each node in the building graph, a gas leakage point and a gas leakage rate of the gas leakage point.

6. The smart gas Internet of Things system for predicting the gas leakage based on indoor safety of claim 5, wherein the gas data includes gas consumption within a preset time period and gas concentration sequence within the preset time period.

7. The smart gas Internet of Things system for predicting the gas leakage based on indoor safety of claim 5, wherein node features of the node sub-graphs include a temperature of each second sub-area, and the edges of the node sub-graphs correspond to the passages between the second sub-areas.

\* \* \* \* \*